United States Patent
Koch

[15] 3,660,111
[45] May 2, 1972

[54] PROCESS FOR AFFECTING TASTE AND ODOR IN LEGUMINOSAE AND IN PARTICULAR PEANUTS AND SOYA BEANS

[72] Inventor: Karl-Hellmut Koch, 4 Hallbergstrasse, Dusseldorf, Germany

[22] Filed: Dec. 18, 1969

[21] Appl. No.: 886,394

Related U.S. Application Data

[63] Continuation-in-part of Ser. No. 477,316, Aug. 4, 1965, abandoned.

[52] U.S. Cl. .................................................................. 99/98
[51] Int. Cl. ............................................................. A23l 1/20
[58] Field of Search .......................... 99/98, 99, 126, 17, 100

[56] References Cited

UNITED STATES PATENTS 3,361,574  1/1968  Paulsen ........................................ 99/98

*Primary Examiner*—A. Louis Monacell
*Assistant Examiner*—William Andrew Simons
*Attorney*—Kenyon & Kenyon Reilly Carr & Chapin

[57] ABSTRACT

The method for improving the taste and smell of legumins wherein the legumins are treated with an aqueous solution of a mixture of at least two acids selected from a group consisting of malic, lactic, tartaric, and citric acids in order to provide the improved taste and smell.

9 Claims, No Drawings

PROCESS FOR AFFECTING TASTE AND ODOR IN LEGUMINOSAE AND IN PARTICULAR PEANUTS AND SOYA BEANS

This application is a continuation-in-part application of my co-pending application Ser. No. 477,316, filed Aug. 4, 1965, now abandoned.

This invention relates to an improved process for affecting taste and odor in leguminosae and in particular peanuts and soya beans.

It is known that leguminoseous material, in particular peanuts and soya beans contain a variety of tastes and odoreous substances which are found to be unpleasant and therefore undesirable. The consequence of this is that leguminoseous material in spite of its low price is employed only to a limited extent for food. The substances which cause the unpleasant taste and odor are not known in detail.

One object of the invention is to provide a process for affecting taste and odor in leguminosae.

A further object of the invention is to treat leguminoseous material, such as peanuts, soya beans and the like substances, with organic acids and thereby to result in neutralizing of the substances causing the adverse effect.

Yet another object of the present invention is to treat the substances adversely affecting taste and odor in nuts such as peanuts or in soya beans, by treating the leguminoseous material in an aqueous solution containing at least two organic acids selected from the group consisting of malic, lactic, tartaric and citric acids.

Further and other objects of the present invention will hereafter more fully appear or will be understood from the following description.

According to the invention the leguminosae are treated with a mixture of at least two organic acids such as malic acid, lactic acid, tartaric acid or citric acid dissolved in water.

The leguminosae to be treated may be in an unchanged state. They may however also be reduced to small pieces.

The treatment medium is dissolved in a quantity of 0.001 to 1 percent by weight of the dry weight of the leguminosae to be treated in water whereby the quantity of acid to be dissolved is determined according to the amount of solution at any given time which the products to be treated are to absorb.

The treatment itself can be effected by supplying the solution to the leguminosae.

Thus the leguminosae can be soaked in the solution. The leguminosae can also be sprayed with the solution.

With such a treatment the leguminosae - related to their dry weight - can absorb from about 1 percent by weight up to about 8 percent by weight of acid solution.

It is recommended to subject the leguminosae to be treated to heating. The heating facilitates the penetration so far as the innermost layers or cells of the leguminosae. The heating is effected at a temperature of about 30° to 110° C. The temperature is so selected that in interaction with the swelling of the products the acid solution penetrates as quickly and completely as possible into the inner layers or cells of the leguminosae.

The heating, i.e. the heating up and the holding of the temperature can be effected directly by a heating of the outer covering of the container containing the leguminosae.

It is however possible to effect a direct heating, for example, by the spraying of steam.

A heating at lower temperatures results in a milder taste of the end product while a heating at higher temperatures gives the end product a stronger taste.

The products moistened by the acid treatment may be dried in known manner according to the intended use. A vacuum drying may also be used.

The treated products can be cut or shaved in the moist as well as in the already dried condition. They may be prepared into pastes according to the process usual with scalded almonds.

The process according to the invention gives the advantage that the effects of the unpleasant taste and odorous substances in leguminosae although these substances are not known in detail, are neutralized or so changed that a greater possibility of use is opened up for the leguminosae, in consequence of the resulting change of aroma and taste.

The proportion of the individual acids in the acid mixture should be at least 15 percent by weight of the total weight of acid. In other words, in order to be effective for the purpose as herein described, the quantity of each acid that is used is at least 15 percent of the total amount of acids present. For example, in a two-acid system the acid components may be varied between about 15 percent and 85 percent by weight. In a three component system, two of the three acids must be present in proportion of at least 15 percent each, and the third as the balance, but not less than 15 percent. Lesser proportions of individual acids have been found to be of limited value for the purpose of this invention.

The following examples are submitted as additional illustrations of the invention, with the exception of Example I.

EXAMPLE I

To each of several 100 parts by weight portions of both peeled and unpeeled peanuts which were preheated to about 60° C. was separately added one aqueous solution of either malic, lactic, tartaric or citric acid. The proportion of acid solution in the different runs was varied between 4 and 15 parts by weight for each 100 parts by weight of peanuts. The proportion of acid in each solution used was varied between about 0.1 and 0.8 parts for each 100 parts by weight of peanuts. The peanuts were wetted for about 2 to 5 hours at a temperature of 60° C. in its respective acidic solution and then dried at a temperature of about 100° C.

After drying the peanuts retained their bean-like odor and strong taste. Although the citric acid run provided slightly improved taste and odor, it was not considered significant. The other three acids did not show any better effect. The use of only one acid is unsatisfying for practical purposes.

EXAMPLE II

To 100 parts by weight of both peeled and unpeeled peanuts which are preheated to 60° C. was added 8 parts by weight of an aqueous solution containing 0.15 parts by weight of an 80 percent lactic acid solution and 0.20 parts by weight of malic acid. The peanuts were wetted for about 2 hours at a temperature of 60° C. in the aqueous acid solution and then dried at a temperature of about 100° C.

The peanuts so treated remind of the taste of almonds with essentially no unpleasant beany taste and strong odor associated with the untreated peanuts left. When treating soya beans in the same manner the bitter and beany taste associated with the untreated soya beans are removed.

EXAMPLE III

To 100 parts by weight of both peeled and unpeeled peanuts which were preheated to 60° C. was added 10 parts by weight of an aqueous solution containing 0.20 parts by weight of citric acid and 0.15 parts by weight of malic acid. The peanuts were wetted for about 2 hours at a temperature of 60° C. in the aqueous acid solution and then dried at a temperature of about 140° C.

The peanuts so treated had a hazelnut-like taste without the unpleasant beany taste and strong odor associated with the untreated peanuts.

EXAMPLE IV

To 100 parts by weight of both peeled an unpeeled peanuts which were preheated to 60° C. was added 8 parts by weight of an aqueous solution containing 0.1 parts by weight of an 80 percent lactic acid, 0.1 part by weight of tartaric acid and 0.2 parts by weight of citric acid. The peanuts were wetted for about 2 hours at a temperature of 60° C. in the aqueous acid solution and then dried at a temperature of about 100° C.

The peanuts so treated had a pleasant sweet-almond-like taste without the unpleasant beany taste and strong odor associated with the untreated peanuts.

When treating soya beans in the same manner the bitter and beany taste associated with the untreated soya beans will be removed.

Application of an aqueous solution of mixtures of at least two of the acids selected from the group consisting of malic acid, lactic acid tartaric acid, and citric acid according to this invention makes it possible for the first time to remove the unpleasant properties of legumins to such a degree that new fields of utilization of soya-beans for human alimentation are opened, and that peanuts, for instance, can be readily employed in the production of candy, pastries and the like.

I claim:

1. The method of processing leguminosae to improve taste or odor, consisting essentially of the steps of soaking the leguminoseous material for at least about 2 hours in an aqueous solution of a mixture of at least two acids selected from the group consisting of malic acid, lactic acid, tartaric acid, and citric acid, whereby the weight of the mixture in the solution represents 0.001 to 1.0 percent of the dry weight of the legumins and the proportion of each acid is at least 15 percent by weight of the total proportion of acids, thereafter removing the treated leguminoseous material from said solution, drying the treated material and comminuting it.

2. The method for improving the taste and smell of legumins, consisting essentially of treating the legumins with an aqueous solution at a temperature between 30° C. and 110° C. for at least about 2 hours, which solution contains a mixture consisting essentially of at least two acids selected from the group consisting of malic, lactic, tartaric, and citric acids, whereby the weight of the mixture in the solution represents 0.001 to 1.0 percent of the dry weight of the legumins and the proportion of each acid is at least 15 percent by weight of the total proportion of acids.

3. The method of claim 2 wherein whole legumins are used and wherein the whole legumins are dried after said treatment.

4. The method of claim 3 wherein said whole legumins are peanuts or soya beans.

5. The method of claim 2 wherein the legumin absorb approximately 1 to 8 percent of their dry weight from the aqueous solution and the legumins are dried after said treatment.

6. The method of claim 5 wherein coarsely chopped legumins are used.

7. The method of claim 5 wherein said legumins are peanuts or soya beans.

8. The method of improving the taste and smell of peanuts and soya beans, consisting essentially of spraying whole peanuts or soya beans at a temperature between 30° C. and 110° C. for at least about 2 hours with an aqueous solution of a mixture consisting essentially of at least two acids selected from the group consisting of malic, lactic, tartaric, and citric acids whereby the weight of the mixture in the solution represents 0.001 to 1.0 percent of the dry weight of the peanuts or soybeans and the proportion of each acid is at least 15 percent by weight of the total proportion of acids and whereby the peanuts or soya beans absorb approximately 1 to 8 percent of their dry weight from the aqueous solution, and drying the peanuts or soya beans thereafter.

9. The method for improving the taste and smell of legumins consisting of treating whole legumins at a temperature between 30° and 110° C. for at least about 2 hours with an aqueous solution containing a mixture consisting essentially of at least two acids selected from the group consisting of malic, lactic, tartaric, and citric acids and whereby the weight of the mixture in the solution represents 0.001 to 1.0 percent of the dry weight of the legumins and the proportion of each acid is at least 15 percent by weight of the total proportion of acids, and then drying the legumins.

* * * * *